(12) United States Patent
Sato et al.

(10) Patent No.: US 8,385,983 B2
(45) Date of Patent: Feb. 26, 2013

(54) MOBILE PHONE APPARATUS WITH OVER VOLTAGE PROTECTION DEVICE

(75) Inventors: Katsuhiro Sato, Kani (JP); Kazuhiro Kuwabara, Handa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1300 days.

(21) Appl. No.: 12/051,545

(22) Filed: Mar. 19, 2008

(65) Prior Publication Data
US 2008/0234010 A1    Sep. 25, 2008

(30) Foreign Application Priority Data
Mar. 22, 2007   (JP) ................. 2007-074238

(51) Int. Cl.
*H04B 1/38* (2006.01)
(52) U.S. Cl. ............. 455/572; 455/573; 455/574
(58) Field of Classification Search ........... 455/572–574
See application file for complete search history.

(56) References Cited

U.S. PATENT DOCUMENTS

| | | | |
|---|---|---|---|
| 2005/0225299 A1* | 10/2005 | Petrovic | 320/141 |
| 2007/0013644 A1 | 1/2007 | Sunda | |
| 2008/0024193 A1* | 1/2008 | Chan et al. | 327/427 |
| 2009/0096413 A1* | 4/2009 | Partovi et al. | 320/108 |

FOREIGN PATENT DOCUMENTS

| | | |
|---|---|---|
| JP | 2005-136874 A | 5/2005 |
| JP | 2006-208595 A | 8/2006 |
| JP | 2007-037339 A | 2/2007 |

OTHER PUBLICATIONS

Japan Patent Office; Japanese Office Action in Japanese Patent Application No. 2006-074238 (counterpart to the above-captioned U.S. Patent Application) mailed Feb. 10, 2009. (partial translation).

* cited by examiner

*Primary Examiner* — Amancio Gonzalez
(74) *Attorney, Agent, or Firm* — Baker Botts L.L.P.

(57) ABSTRACT

A mobile phone apparatus is provided. The mobile phone apparatus includes a charger for supplying power to a rechargeable battery including a connection portion and a main telephone unit. The main telephone unit includes a rechargeable battery detection unit which detects whether the connection portion of the rechargeable battery is connected to the main telephone unit; an overvoltage protection unit which is coupled to the connection portion of the rechargeable battery and switches between an active state of supplying power output from the connection portion and an inactive state of not supplying power output from the connection portion; and a controller which controls the overvoltage protection unit to switch the overvoltage protection unit into the active state if the rechargeable battery detection unit detects that the rechargeable battery is connected.

8 Claims, 4 Drawing Sheets

MOBILE PHONE APPARATUS WITH OVER VOLTAGE PROTECTION DEVICE

CROSS-REFERENCE TO RELATED APPLICATION

This application claims priority from Japanese Patent Application No. 2007-074238, filed on Mar. 22, 2007, the entire subject matter of which is incorporated herein by reference.

TECHNICAL FIELD

Aspects of the present invention relate to a mobile phone apparatus including voltage protection, and more particularly, to a mobile phone apparatus having a main telephone unit and a charger which supplies power to a rechargeable battery inside the main telephone unit.

BACKGROUND

Various related art mobile phone apparatuses have been proposed that include a main telephone unit having a rechargeable battery, and a charger which supplies power to the rechargeable battery. For example, Japanese Patent Application No. JP-A-2006-208595 describes a related art mobile phone apparatus that in a state where the main telephone unit is installed in the charger and a function key is depressed for a designated time or more to make a request for transition to an illumination mode of using light of a backlight of a liquid crystal display screen for illumination, a message indicating the transition to the illumination mode is displayed on the liquid crystal display screen. Then, after an elapse of a predetermined amount of time, a light emission amount of the backlight is increased or a contrast of the liquid crystal display screen is set low to increase a transmission light amount of the backlight that is transmitted through the liquid crystal screen.

However, with the arrangement described in JP-A-2006-208595, in order to increase the light emission amount of the backlight, power supplied to a backlight drive circuit that drives the backlight has to be increased and overvoltage protection has to be provided so that an overvoltage is not applied. The increased power and overvoltage protection are carried out by means of a voltage booster circuit that boosts an output voltage of the rechargeable battery. Overvoltage protection in a booster circuit is high in cost and poor in efficiency.

An alternative method is to supply the supply power of the charger directly to respective devices via a Zener diode without involving the voltage booster circuit. However, this alternative method has a disadvantage in that the voltage of the supply power is unstable, etc.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a mobile phone apparatus which enables power to be supplied to respective devices at low cost without lowering an output voltage of a rechargeable battery that is installed on a charger and is adequately charged and a mobile phone apparatus provided with overvoltage protection to prevent application of an overvoltage to respective devices when the main telephone unit is installed in the charger without the rechargeable battery being connected to the main telephone unit.

The above and other aspects of the present invention are accomplished by providing a mobile phone apparatus comprising: a charger for supplying power to a rechargeable battery including a connection portion; and a main telephone unit including a rechargeable battery detection unit which detects whether the connection portion of the rechargeable battery is connected to the main telephone unit; an overvoltage protection unit which is coupled to the connection portion of the rechargeable battery and switches between a state of supplying power output from the connection portion and a state of not supplying power output from the connection portion; and a controller which controls the overvoltage protection unit to switch into the state of supplying power output from the connection portion if the rechargeable battery detection unit detects that the rechargeable battery is connected.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

Exemplary embodiments of the present invention will now be described in detail with reference to the drawings. One of ordinary skill in the art will appreciate that the inventive concept of the present invention is applicable to any cordless or wireless phone (mobile device/telephone) equipped in a multi function device (MFP) such as a multi function device with a scanner function, a printer function, a facsimile function, a telephone function, etc.

<First Exemplary Embodiment>
[Arrangement of a Mobile phone Apparatus]

Figure 1:
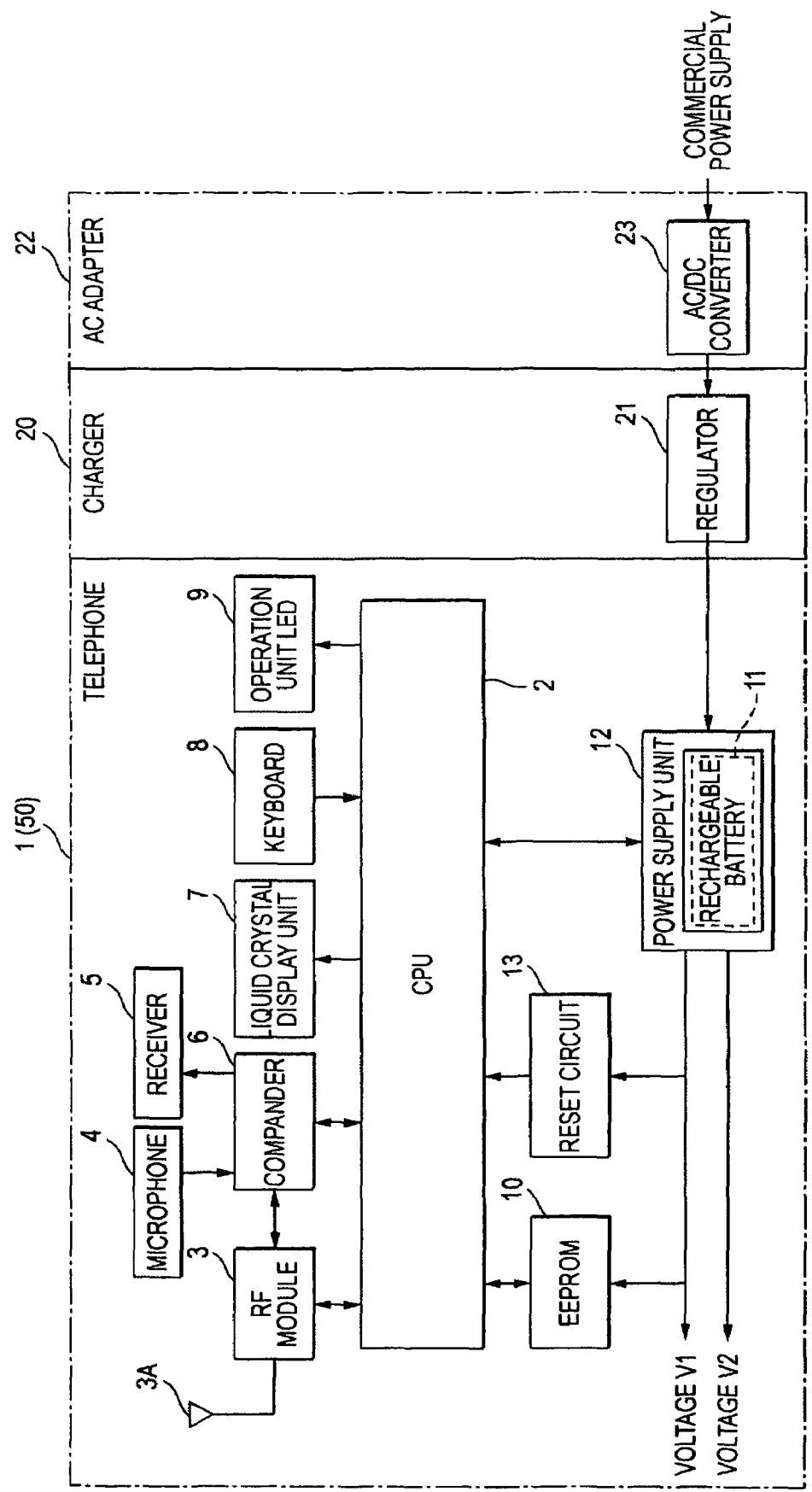
FIG. 1 is a block diagram of a mobile phone apparatus according to a first exemplary embodiment of the present invention.

A general arrangement of a mobile phone apparatus 1 (also referred herein to as a telephone 1) according to a first exemplary embodiment shall now be described with reference to FIG. 1. FIG. 1 is a block diagram of the mobile phone apparatus 1 according to the first exemplary embodiment. As shown in FIG. 1, the telephone 1 includes a central processing unit (CPU) 2, performing overall control of various devices equipped in the telephone 1, a radio frequency (RF) module 3, performing sending and receiving of radio waves via an antenna 3A, a microphone 4, converting a sound input from an exterior of the telephone 1 into a sound signal, a receiver 5, converting a sound signal to a sound and outputting the sound to the exterior of the telephone 1, and a compander 6, performing dynamic range compression and expansion of an input signal.

The telephone 1 also includes a liquid crystal display unit 7, displaying characters, a keyboard 8, comprising various keys for external operation of the telephone 1, an operation unit light emitting diode (LED) 9, lighting up a specific key in the keyboard 8, and an electronically erasable and programmable read only memory (EEPROM) 10 that is anon-volatile memory, with which stored contents can be rewritten.

The telephone 1 also includes a power supply unit 12, charging a rechargeable battery 11 that supplies power to the various devices equipped in the telephone 1. As shall be described later, the power supply unit 12 supplies, to respective devices, a fixed voltage V1 (of, for example, approximately 3.3V), and a voltage V2 (of, for example, approximately 3.8V to approximately 3.9V) at a connection portion of the rechargeable battery 11 in a charged state (see FIG. 2). For example, the power supply unit 12 supplies the fixed voltage V1 to the CPU 2, EEPROM 10, etc., and supplies the voltage V2 to the RF module 3, the liquid crystal display unit 7, etc. The telephone 1 also includes a reset circuit 13 that resets the CPU 2 according to the output voltage V1 of the power supply unit 12.

More specifically, the CPU 2 is not constituted simply as a CPU but has incorporated therein a ROM (not shown), storing various processing programs to be executed by the CPU 2, a RAM (not shown), used as a storage region during execution of various processes, a connection port (not shown), connecting the CPU 2 to various devices, a timer (not shown), performing measurement of time, etc.

The RF module 3 sets a radio wave transmission frequency and a reception frequency based on frequency setting data input from the CPU 2, superimposes an input signal from the compander 6 onto the radio wave and transmits the radio wave to the exterior of the telephone 1 via the antenna 3A, and also extracts signals (sound signals or data signals) superimposed onto a radio wave received from the exterior of the telephone 1 via the antenna 3A and outputs the signals to the compander 6. The RF module 3 also outputs to the CPU 2 a radio wave intensity signal (RSSI signal), indicating an intensity of a received radio wave, and a carrier sense signal, indicating that a radio wave is received from a main device.

Based on control signals input from the CPU 2, the compander 6 compresses the dynamic range of a sound signal input from the microphone 4 and then outputs the sound signal to the RF module 3, and expands the dynamic range of a sound signal input from the RF module 3 and then outputs the sound signal to the receiver 5 or outputs a data signal, input from the RF module 3, with the dynamic range as it is to the CPU 2.

When any of the various keys is depressed, the keyboard 8 outputs a depression signal, indicating the key that is depressed, to the CPU 2. The operation unit LED 9 lights up a specific key on the keyboard 8 based on a lighting signal input from the CPU 2. For example, an external line key (not shown), which is depressed for connecting the telephone 1 to an external line, an extension line key (not shown), which is depressed for connecting the telephone 1 to an extension line, an end call key (not shown), which is depressed to disconnect (cut off) connection of the telephone 1 with an external line or an extension line, or a function key (not shown), which is depressed to perform any of various settings of the telephone 1, etc., is lit up.

The EEPROM 10 stores various setting values of the telephone 1 and also outputs the various setting values to the CPU 2 or performs rewriting of the various settings according to requests from the CPU 2. The rechargeable battery 11 of the power supply unit 12 is arranged to be freely detachable and attachable with respect to the telephone 1. When the rechargeable battery 11 is attached to (installed on) the telephone 1, the connection portion of the rechargeable battery is connected to the telephone 1. When the telephone 1 is set on the charger 20, power of a voltage (of, for example, approximately 7V DC to approximately 8V DC) is supplied from an external commercial power supply (of, for example, approximately 100V AC) to the power supply unit 12 via an alternating current (AC) to direct current (DC) converter 23 of an AC adapter 22, connected to the commercial power supply at the exterior of the telephone 1, and a regulator 21 of the charger 20.

The reset circuit 13 detects the output voltage V1 of the power supply unit 12, and if the output voltage V1 falls below a minimum voltage Vlow (of, for example, approximately 3.0V DC), at which normal operation of the CPU 2 can be performed, the reset circuit 13 outputs, to the CPU 2, a reset signal that resets the CPU 2.

Figure 2:
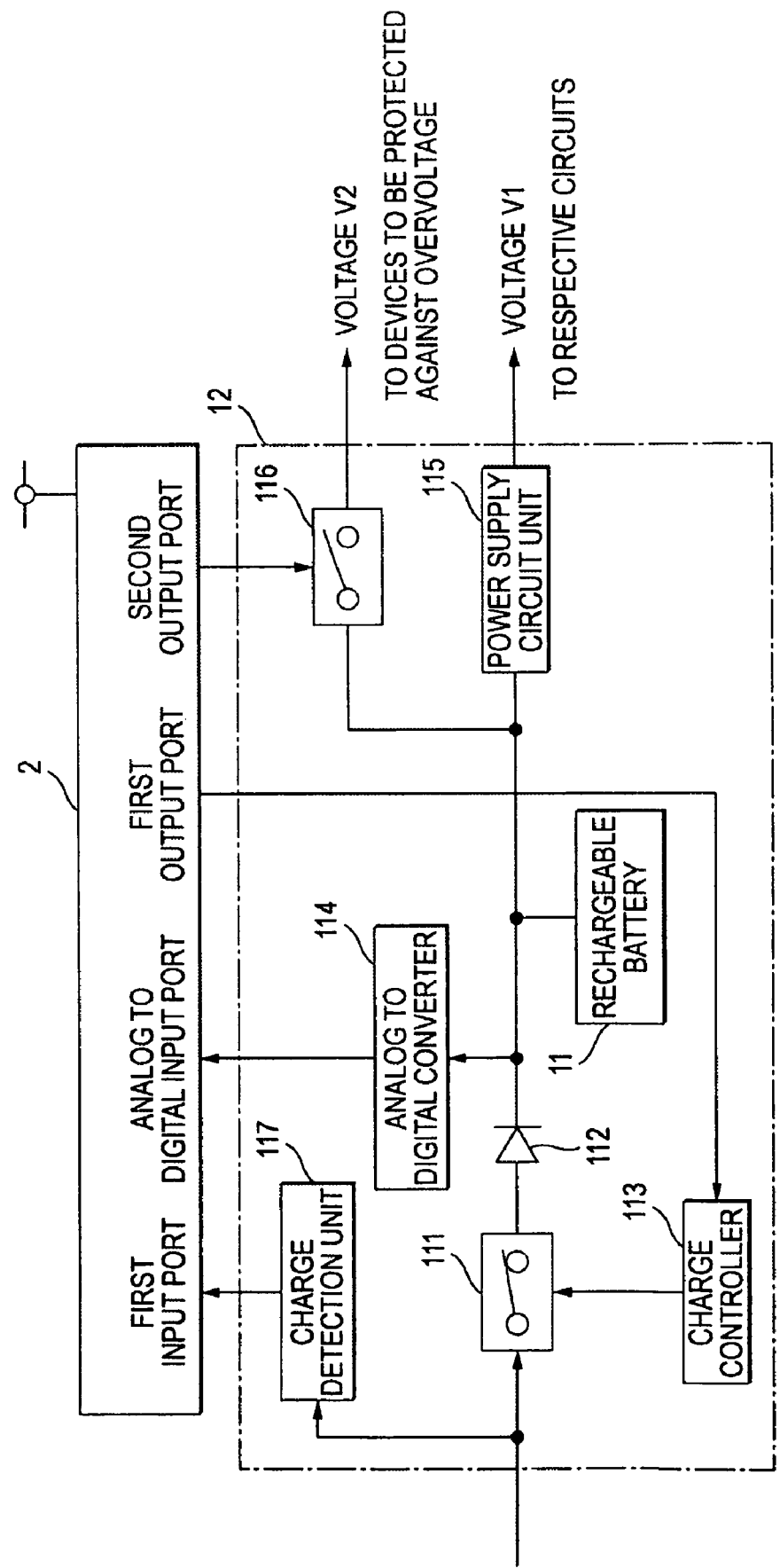
FIG. 2 is a block diagram of a power supply unit of the mobile phone apparatus of FIG. 1.

The power supply unit 12 is arranged as shown in FIG. 2. FIG. 2 is a block diagram of the power supply unit 12 of FIG. 1. As shown in FIG. 2, the power supply unit 12 includes a field-effect transistor (FET) switch 111, a source side of which is coupled to the regulator 21 of the charger 20 (see FIG. 1), and a diode 112, an anode of which is coupled to a drain side of the FET switch 111 and a cathode of which is coupled to the connection portion of the rechargeable battery 11. A charge controller 113 is coupled to a gate of the FET switch 111. In accordance with an output signal from a first output port of the CPU 2, the charge controller 113 outputs to the gate of the FET switch 111, a High signal that puts the FET switch 111 in an on state, in which power from the regulator 21 is made to flow, or a Low signal that puts the FET switch 111 in an off state, in which power from the regulator 21 is cut off.

An input portion of an analog to digital converter 114 is coupled to the connection portion of the rechargeable battery 11, and an output portion of the analog to digital converter 114 is coupled to an analog to digital input port of the CPU 2. The analog to digital converter 114 is a circuit that converts an input voltage into a digital value and outputs the digital value, and the CPU 2 detects the voltage at the connection portion of the rechargeable battery 11 based on the output signal of the analog to digital converter 114. A power supply circuit unit 115, comprising a regulator, etc., has an input portion coupled to the connection portion of the rechargeable battery 11 and outputs the voltage at the connection portion of the rechargeable battery 11 (of, for example, approximately 3.8V DC to approximately 3.9V DC when the rechargeable battery 11 is installed and approximately 7V DC to approximately 8V DC when the rechargeable battery 11 is not installed) at a fixed voltage of the voltage V1 (of, for example, approximately 3.3V DC) to the CPU 2, the EEPROM 10, the reset circuit 13, etc.

A source side of a FET switch 116 is coupled to the connection portion of the rechargeable battery 11. The RF module 3, the liquid crystal display unit 7, etc., are coupled to the drain side of the FET switch 116. The second output port of the CPU 2 is coupled to a gate of the FET switch 116. The FET switch 116 is set to an on state of making power from the connection portion of the rechargeable battery 11 flow when a High signal is input from an second output port of the CPU 2, and is set to an off state of cutting off power from the connection portion of the rechargeable battery 11 when a Low signal is input from the second output port of the CPU 2.

Thus, by setting the FET switch 116 to the on state, power can be supplied at high efficiency to the RF module 3, the liquid crystal display unit 7, etc., coupled to the drain side of the FET switch 116, without lowering the voltage at the connection portion of the rechargeable battery 11. Meanwhile, by setting the FET switch 116 to the off state, the supply of power to the RF module 3, the liquid crystal display unit 7, etc., coupled to the drain side of the FET switch 116, can be cut off.

An input portion of a charge detection unit 117 is coupled to the source side of the FET switch 111, and an output portion of the charge detection unit 117 is coupled to a first input port of the CPU 2. The charge detection unit 117 outputs a High signal to the CPU 2 when a voltage (of, for example, approximately 7V DC to approximately 8V DC) is input and outputs a Low signal to the CPU 2 when the voltage (of, for example, approximately 7V DC to approximately 8V DC) is not input. The CPU 2 can thereby determine whether the telephone 1 is set on the charger 20 based on the signal input from the first input port.

[First Overvoltage Prevention Process]

Figure 3:
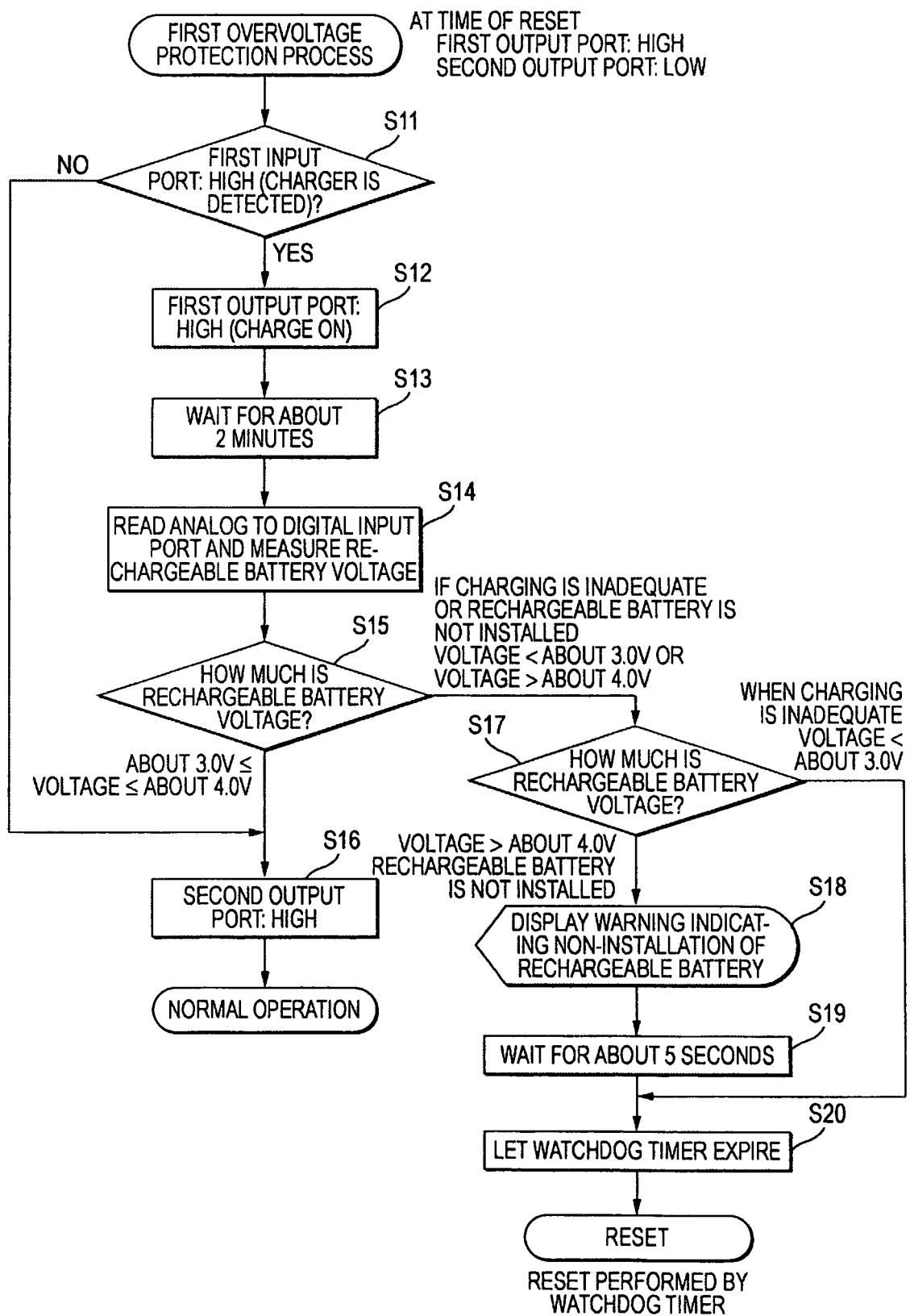
FIG. 3 is a flowchart of an overvoltage prevention process according to an exemplary embodiment of the present invention.

A "first overvoltage prevention process," which is a process executed by the CPU 2 of the telephone 1 at a startup time to prevent overvoltage power from being supplied to respective devices, such as the RF module 3, the liquid crystal display unit 7, etc., coupled to the drain side of the FET switch 116, shall now be described with reference to FIG. 3. FIG. 3 is a flowchart of an overvoltage prevention process according to an exemplary embodiment of the present invention for preventing overvoltage power from being supplied to respective devices, such as the RF module 3, etc., coupled to the drain side of the FET switch 116.

As shown in FIG. 3, at operation S11, the CPU 2 executes, at a startup time, a determination process of determining whether a High signal is input into the first input port. That is, the CPU 2 executes the determination process of determining whether the telephone 1 is set on the charger 20 and power of the voltage (of, for example, approximately 7V DC to approximately 8V DC) is supplied to the FET switch 111 of the power supply unit 12 from the regulator 21. When the CPU 2 of the telephone 1 is started up or reset, a High signal is output from the first output port and the FET switch 111 is set to the on state. Also, when the CPU 2 of the telephone 1 is started up, a Low signal is output from the second output port and the FET 116 is set to the off state.

If it is determined that the High signal is input into the first input port (S11: YES), the CPU 2 performs an operation S12. At operation S12, the CPU 2 outputs a High signal from the first output port and the High signal is input into the charge controller 113. A High signal is then output from the charge controller 113 to the gate of the FET switch 111, and the FET switch 111 is set to the on state. Power supplied from the regulator 21 is thereby supplied from the drain side of the FET switch 111 to the connection portion of the rechargeable battery 11 via the diode 112 and charging of the rechargeable battery 11 is started.

At operation S13, the CPU 2 stands by for approximately 2 minutes. If the rechargeable battery 11 is installed in the telephone 1, the rechargeable battery 11 is thereby charged. At operation S14, the CPU 2 reads the input signal from the analog to digital input port. That is, the CPU 2 detects the voltage at the connection portion of the rechargeable battery 11, output from the analog to digital converter 114.

Thereafter, at operation S15, the CPU 2 determines whether the voltage at the connection portion of the rechargeable battery 11 is within a threshold voltage range (whether the voltage is within a voltage range, for example, of no less than approximately 3.0V DC to no more than approximately 4.0V DC). That is, the CPU 2 determines whether the installed rechargeable battery 11 is adequately charged.

If the CPU 2 determines that the voltage at the connection portion of the rechargeable battery 11 is within the threshold voltage range, a process continues with operation S16. At operation S16, the CPU 2 outputs a High signal from the second output port to the gate of the FET switch 116, that is, the CPU 2 sets the FET switch 116 to the on state and thereafter executes normal operation processes.

Power at the connection portion of the rechargeable battery 11 is thereby supplied to the respective devices, such as the RF module 3, the liquid crystal display unit 7, etc., coupled to the drain side of the FET switch 116. Thus, if the rechargeable battery is in an adequately charged state, power of the voltage V2 (of, for example, approximately 3.8V DC to approximately 3.9V DC), which is higher than the voltage V1 (of, for example, approximately 3.3V DC) output from the power supply circuit unit 115, is supplied from the FET switch 116 to the respective devices, such as the RF module 3, the liquid crystal display unit 7, etc. The RF module 3 can thereby be improved in transmission and reception performance.

If it is determined that a Low signal is input into the first input port at operation S11, that is, if the telephone 1 is not set on the charger 20 (S11: NO), the CPU 2 continues with operation S16. Because the CPU 2 then sets the FET switch 116 to the on state, the power at the connection portion of the rechargeable battery 11 is supplied to the respective devices, such as the RF module 3, the liquid crystal display unit 7, etc., coupled to the drain side of the FET switch 116.

If at operation S15, the voltage at the connection portion of the rechargeable battery 11 is not within the threshold voltage range, the CPU 2 continues with operation S17. At operation S17, the CPU 2 executes a determination process of determining whether the voltage at the connection portion of the rechargeable battery 11 exceeds the threshold voltage range (whether the voltage exceeds, for example, approximately 4.0V DC), that is, whether the rechargeable battery 11 is installed.

If the voltage at the connection portion of the rechargeable battery 11 exceeds the threshold voltage range, that is, if the rechargeable battery 11 is not installed (S17: Rechargeable battery not installed), the CPU 2 continues with operation S18. At operation S18, the CPU 2 controls the liquid crystal display unit 7 to display that the rechargeable battery 11 is not installed. Thereby a user may be warned. For example, the CPU 2 displays a note such as "Rechargeable battery is not mounted!" on the liquid crystal display unit 7.

Then, at operation S19, the CPU 2 stands by for approximately 5 seconds. This allows time for a user to check the warning statement displayed on the liquid crystal display unit 7. Then, at operation S20, the CPU 2 starts operation of a watchdog timer and when the timer expires, performs an interrupt and executes a reset process. Then, in accordance with the reset interrupt, the CPU 2 returns to operation S11.

Meanwhile, if at operation S17, the voltage at the connection portion of the rechargeable battery 11 is lower than the threshold voltage range (for example, lower than approximately 3.0V DC), that is, if the charging of the rechargeable battery 11 is inadequate (S17: Charging inadequate), the CPU 2 continues with operation S20. Then, in accordance with the reset interrupt, the CPU 2 returns to operation S11 and the charging of the rechargeable battery 11 is continued.

[Effects of the First Exemplary Embodiment]

As described in detail above, with the telephone 1 according to the first exemplary embodiment, if the rechargeable battery 11 that is adequately charged is installed (S15), the FET switch 116 is set to the on state (S16). The power can thus be supplied with stability to the respective devices, such as the RF module 3, the liquid crystal display unit 7, etc., without lowering the voltage V2 at the connection portion of the rechargeable battery 11 that is installed on the charger 20 and is adequately charged, and at low cost and high efficiency. Because the CPU 2 needs only to output a High signal or a Low signal to the FET switch 116, the telephone 1 can be made simple in arrangement and the manufacturing cost can be reduced.

Also, because the CPU 2 detects the voltage of the rechargeable battery 11 via the analog to digital converter 114 after the elapse of 2 minutes after setting the FET switch 111 to the on state (S12 to S14), the installation or non-installation of the rechargeable battery 11 can be detected reliably. If the rechargeable battery 11 is not installed, because the CPU 2 then keeps the FET switch 116 in the off state (S15: Rechargeable battery not installed. through S17: Rechargeable battery not installed. to S20), overvoltage power, output from the connection portion of the rechargeable battery 11 without being voltage dropped, can be reliably prevented from being supplied to the respective devices, such as the RF module 3, etc., coupled to the drain side of the FET switch 116.

Detection of the rechargeable battery that is not adequately charged is also enabled (S15: Charging inadequate. through S17: Charging inadequate. to S20), and the CPU 2 can set the FET switch 116 to the off state to prevent an inadequate voltage from being supplied to the respective devices, such as the RF module 3, the liquid crystal display unit 7, etc. Also, if the rechargeable battery 11 is not installed (S17: Rechargeable battery not installed.), because the CPU 2 then displays, on the liquid crystal display unit 7, the warning indicating that the rechargeable battery 11 is not installed (S18), the user can reliably confirm that the rechargeable battery 11 is not installed.

Also, because at the startup time or reset time, the FET switch 111 is set to the on state, power can be supplied to the rechargeable battery 11 reliably when the telephone 1 is set on the charger 20. Also, because at the startup time or reset time, the FET switch 116 is set to the off state, overvoltage power, output from the connection portion of the rechargeable battery 11 without being voltage dropped, can be reliably prevented from being supplied to the respective devices, such as the RF module 3, etc., even when the rechargeable battery 11 is not installed.

Also, because when power is not supplied from the charger 20 (S11: NO), the CPU 2 sets the FET switch 116 to the on state (S16), when the telephone 1 is not set on the charger 20, the power of the rechargeable battery 11 can be supplied reliably to the respective devices, such as the RF module 3, etc., connected to the drain side of the FET switch 116.

Also, because a field-effect transistor (FET) switch is used as the FET switch 116, power can be supplied to the respective devices without lowering of the battery voltage, at low cost, and at high efficiency by a simple arrangement.

<Second Exemplary Embodiment>

Figure 4:
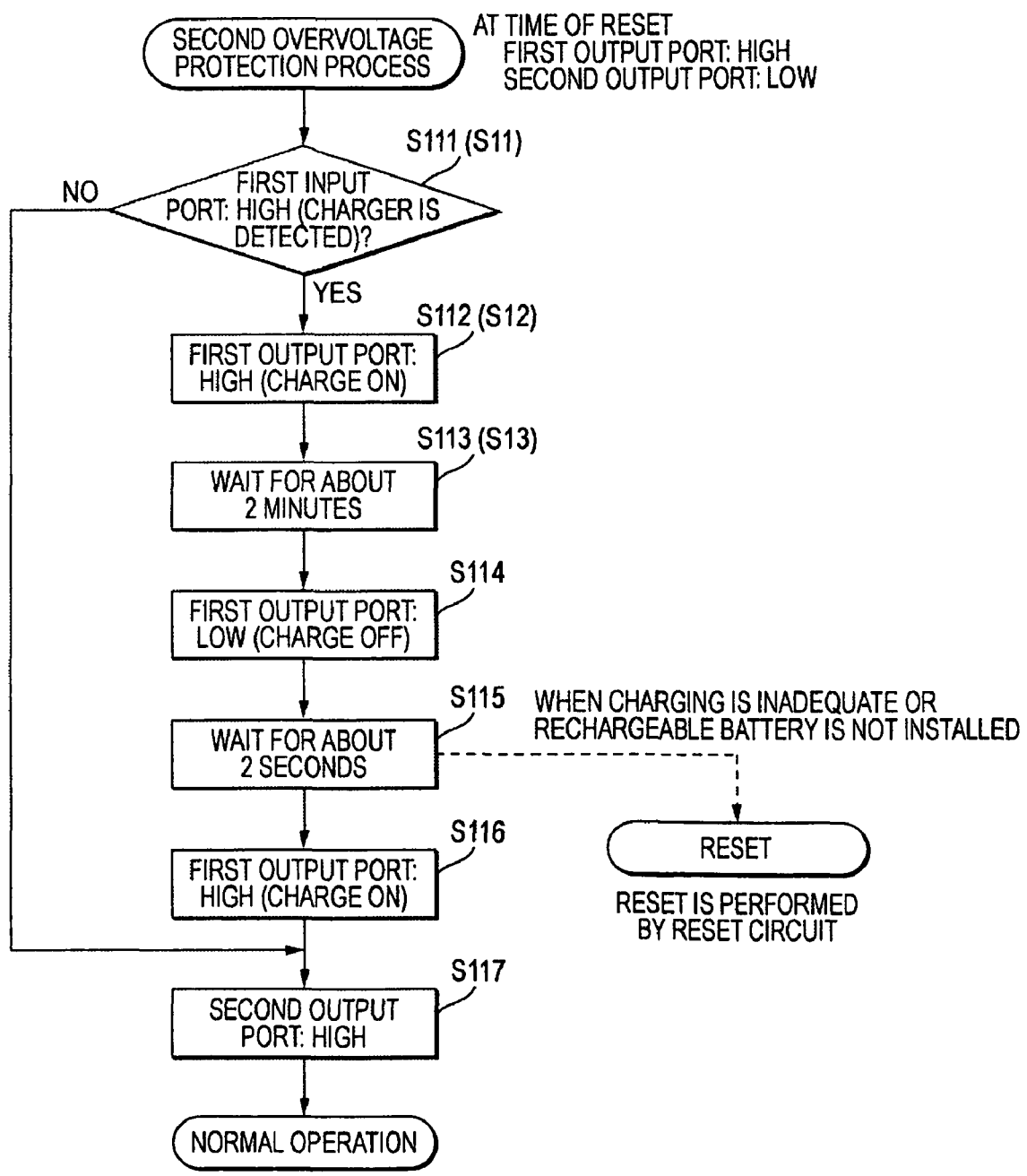
FIG. 4 is a flowchart of an overvoltage prevention process according to another exemplary embodiment of the present invention.

A telephone 50, according to a second exemplary embodiment shall now be described with reference to FIG. 1 and FIG. 4. The symbols that are the same as those of the telephone 1 according to the first exemplary embodiment indicate components that are the same as or correspond to the components of the telephone 1 according to the first exemplary embodiment. FIG. 4 is a flowchart of a second overvoltage prevention process that is executed by the CPU 2 of the telephone 50 according to the second exemplary embodiment to prevent overvoltage power from being supplied to respective devices, such as the RF module 3, etc.

An overall arrangement of the telephone 50 according to the second exemplary embodiment is substantially the same as the arrangement (without the analog to digital converter) of the telephone 1 according to the first exemplary embodiment. A control arrangement and control processes of the telephone 50 according to the second exemplary embodiment are also same as the control arrangement and the control processes of the telephone 1 according to the first exemplary embodiment. However, the CPU 2 of the telephone 50 differs from the telephone 1 according to the first exemplary embodiment in executing the "second overvoltage prevention process" in place of the "first overvoltage prevention process" at the startup time and the reset time.

[Second Overvoltage Prevention Process]

FIG. 4 shows a flowchart of a "second overvoltage prevention process" according to the second exemplary embodiment that prevents overvoltage power from being supplied to respective devices, such as the RF module 3, etc. As shown in FIG. 4, the CPU 2 executes, in operation S111 to operation S113, the above-described operation S11 to operation S13. When the CPU 2 of the telephone 50 is started up or reset, a High signal is output from the first output port and the FET switch 111 is set to the on state. Also, when the CPU 2 of the telephone 50 is started up, a Low signal is output from the second output port and the FET switch 116 is set to the off state.

At operation S114, the CPU 2 outputs a Low signal from the first output port and the Low signal is input into the charge controller 113. A Low signal is then output from the charge controller 113 to the gate of the FET switch 111 and the FET switch 111 is set to the off state. Power from the regulator 21 is thereby cut off and the charging of the rechargeable battery 11 is stopped.

Then, at operation S115, the CPU 2 stands by for approximately 2 seconds. If the rechargeable battery 11 is not installed or the rechargeable battery 11 is inadequately charged, because the FET switch 111 is in the off state, the output voltage V1 of the power supply circuit unit 115 falls below the minimum voltage Vlow (of, for example, approximately 3.0V), at which normal operation of the CPU 2 may be maintained. The reset circuit 13 thus outputs, to the CPU 2, the reset signal that resets the CPU 2. The reset interrupt is thereby activated in the CPU 2 and the operations from operation S111 are executed again. Thus, if the rechargeable battery 11 is not installed or the rechargeable battery 11 is inadequately charged, the FET switch 116 is maintained in the state of being set in the off state.

On the other hand, if the rechargeable battery 11 is installed and is adequately charged, even if the FET switch 111 is in the off state, power is supplied from the rechargeable battery 11 to the power supply circuit unit 115. The power supply circuit unit 115 then supplies a power of no less than the minimum voltage Vlow (of, for example, approximately 3.0V DC), at which normal operation of the CPU 2 may be maintained, to the reset circuit 13, the CPU 2, etc. Because the reset circuit 13 thus does not output the reset signal, the CPU 2 executes the operations from operation S116.

At operation S116, the CPU 2 outputs a High signal from the first output port and the High signal is input into the charge controller 113. A High signal is then output from the charge controller 113 to the gate of the FET switch 111 and the FET switch 111 is set to the on state. Power supplied from the regulator 21 is thereby supplied from the drain side of the FET switch 111 to the connection portion of the rechargeable battery 11 via the diode 112 and the charging of the rechargeable battery 11 is restarted.

At operation S117, the CPU 2 outputs a High signal from the second output port to the gate of the FET switch 116, that is, sets the FET switch 116 to the on state and thereafter executes normal operation processes. Power at the connection portion of the rechargeable battery 11 is thereby supplied to the respective devices, such as the RF module 3, the liquid crystal display unit 7, etc., coupled to the drain side of the FET switch 116. Thus, if the rechargeable battery 11 is in the adequately charged state, power of the voltage V2 (of, for example, approximately 3.8V DC to approximately 3.9V DC), which is higher than the voltage V1 (of, for example, approximately 3.3V DC) output from the power supply circuit unit 12 is supplied from the FET switch 116 to the respective devices, such as the RF module 3, the liquid crystal display unit 7, etc. The RF module 3 can thereby be improved in transmission and reception performance.

If a Low signal is input into the first input port at operation S111, that is, if the telephone 50 is not set on the charger 20 (S111: NO), the CPU 2 continues with operation S117. Because the CPU 2 then sets the FET switch 116 to the on state, power (of, for example, 3.6V DC) at the connection portion of the rechargeable battery 11 is supplied to the respective devices, such as the RF module 3, the liquid crystal display unit 7, etc., coupled to the drain side of the FET switch 116.

[Effects of the Second Exemplary Embodiment]

As described in detail above, with the telephone 50 according to the second exemplary embodiment, the CPU 2 sets the FET switch 111 to the off state for approximately 2 seconds and thereafter sets the FET switch 111 to the on state again (S114 to S116). Thus, if the rechargeable battery 11 is not installed or the rechargeable battery 11 is inadequately charged, because the necessary power is not supplied to the reset circuit 13 and the CPU 2 from the power supply circuit unit 115, the reset interrupt is activated in the CPU 2 and the FET switch 116 can be maintained in the off state. Thus, when startup is performed again, overvoltage power, output from the connection portion of the rechargeable battery 11 without being voltage dropped, can be reliably prevented from being supplied to the respective devices, such as the RF module 3, etc., coupled to the drain side of the FET switch 116.

If the rechargeable battery 11 that is adequately charged is installed, because the FET switch 116 is set to the on state, the output voltage V2 of the rechargeable battery 11, which is installed on the charger 20 and is adequately charged, can be supplied with stability without being lowered and at low cost and high efficiency to the respective devices, such as the RF module 3, the liquid crystal display unit 7, etc. Because the CPU 2 needs only to output a High signal or a Low signal to the FET switch 116, the telephone 50 can be made simple in arrangement and the manufacturing cost can be reduced. Also, because there is no need to detect the voltage of the rechargeable battery 11 via the analog to digital converter 114, the analog to digital converter 114 can be eliminated to make the circuit of the power supply unit 12 more compact.

Also, because at the startup time or reset time, the FET switch 111 is set to the on state, power can be supplied to the rechargeable battery 11 reliably when the telephone 50 is set on the charger 20. Also, because at the startup time or reset time, the FET switch 116 is set to the off state, overvoltage power, output from the connection portion of the rechargeable battery 11 without being voltage dropped, can be reliably prevented from being supplied to the respective devices, such as the RF module 3, etc., even when the rechargeable battery 11 is not installed.

Also, because when power is not supplied from the charger 20 (S111: NO), the CPU 2 sets the FET switch 116 to the on state (S117) when the telephone 50 is not set on the charger 20, the power of the rechargeable battery 11 can be supplied reliably to the respective devices, such as the RF module 3, etc., coupled to the drain side of the FET switch 116.

The present invention provides illustrative non-limiting embodiments as follows:

A mobile phone apparatus comprises: a charger for supplying power to a rechargeable battery including a connection portion and a main telephone unit. The main telephone unit comprises: a rechargeable battery detection unit which detects whether the rechargeable battery is connected to the main telephone unit; an overvoltage protection unit which is coupled to the connection portion of the rechargeable battery and switches between an active state of supplying power output from the connection portion and an inactive state of not supplying power output from the connection portion; and a controller which controls the overvoltage protection unit to switch the overvoltage protection unit into the active state if the rechargeable battery detection unit detects that the rechargeable battery is connected.

The mobile phone apparatus may further comprise a battery voltage detection unit which detects a voltage at the connection portion of the rechargeable battery. The rechargeable battery detection unit may detect whether the rechargeable battery is connected to the main telephone unit based on the voltage detected by the battery voltage detection unit after an elapse of an amount of time from a startup time.

The mobile phone apparatus may further comprise a notification unit which generates a warning if the rechargeable battery detection unit detects that the rechargeable battery is not connected.

The mobile phone apparatus may further comprise an initialization controller which switches the overvoltage protection unit into the inactive state at a startup time.

A mobile phone apparatus comprise: a charger for supplying power to a rechargeable battery including a connection portion; and a main telephone unit. The main telephone unit comprises:; a supply power connecting unit which switches between a first active state of supplying power supplied from the charger to the rechargeable battery and a first inactive state of not supplying power supplied from the charger to the rechargeable battery; an overvoltage protection unit which is coupled to the connection portion of the rechargeable battery and switches between a second active state of supplying power output from the connection portion and a second inactive state of not supplying power output from the connection portion; an off setting unit which controls the supply power connecting unit to switch the supply power connecting unit into the first inactive state after an elapse of a first amount of time from a startup time; and a controller which controls the overvoltage protection unit to switch the overvoltage protection unit into the second active state after an elapse of a second amount of time from a time when the supply power connecting unit is switched into the first inactive state.

The mobile phone apparatus may further comprise an initialization control unit which switches the supply power connecting unit into the first active state and switches the overvoltage protection unit into the second inactive state at the startup time.

The mobile phone apparatus may further comprise a charger detection unit which detects whether the charger supplies power. If the charger detection unit detects that the charger does not supply power, the controller may control the overvoltage protection unit to switch the overvoltage protection unit into the active state.

The overvoltage protection unit may comprise a field effect transistor switch.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A mobile phone apparatus comprising:
a charger configured to supply power to a rechargeable battery comprising a connection portion;
a main telephone device comprising:
a supply power connecting device configured to switch between a first active state of supplying power from the charger to the connection portion of the rechargeable battery and a first inactive state of not supplying power from the charger to the connection portion of the rechargeable battery;
a charger detection device configured to determine whether the charger supplies power;
a supply setting device configured to set the supply power connecting device into the first active state when the charger detection device detects that the charger supplies power;
a rechargeable battery detection device configured to detect whether the connection portion of the rechargeable battery is connected to the main telephone device;
an overvoltage protection device configured to be coupled to the connection portion of the rechargeable battery and configured to switch between a second active state of supplying power output from the connection portion to a device to be protected and a second inactive state of not supplying power output from the connection portion to the device to be protected;
an initialization controller configured to switch the overvoltage protection device into the second inactive state at a startup time; and
a controller configured to control the overvoltage protection device to switch into the second active state when the rechargeable battery detection device detects that the rechargeable battery is connected, after the initialization controller switches the overvoltage protection device into the second inactive state.

2. The mobile phone apparatus according to claim 1, further comprising a battery voltage detection device configured to detect a voltage at the connection portion of the rechargeable battery,
wherein the rechargeable battery detection device is configured to detect whether the rechargeable battery is connected to the main telephone device based on the voltage detected by the battery voltage detection device after an elapse of an amount of time from a startup time.

3. The mobile phone apparatus according to claim 1, further comprising a notification device configured to generate a warning when the rechargeable battery detection device detects that the rechargeable battery is not connected.

4. The mobile phone apparatus according to claim 1,
wherein, when the charger detection device detects that the charger does not supply power, the controller is configured to control the overvoltage protection device to switch the overvoltage protection device into the active state.

5. The mobile phone apparatus according to claim 1, wherein the overvoltage protection device comprises a field effect transistor switch.

6. A mobile phone apparatus comprising:
a charger configured to supply power to a rechargeable battery comprising a connection portion; and
a main telephone device comprising:
a supply power connecting device configured to switch between a first active state of supplying power supplied from the charger to the connection portion of the rechargeable battery and a first inactive state of not supplying power supplied from the charger to the connection portion of the rechargeable battery;
an overvoltage protection device configured to be coupled to the connection portion of the rechargeable battery and configured to switch between a second active state of supplying power output from the connection portion to a device to be protected and a second inactive state of not supplying power output from the connection portion to the device to be protected;
an initialization control device configured to switch the supply power connecting device into the first active state and to switch the overvoltage protection device into the second inactive state at a startup time
an off setting device configured to control the supply power connecting device to switch the supply power connecting device into the first inactive state after a first period of time from a time when the initialization control device switches the supply power connecting device into the first active state; and
a controller configured to control the overvoltage protection device to switch into the second active state when a predetermined voltage is supplied from the connection portion of the rechargeable battery after a second period of time from a time when the supply power connecting device is switched into the first inactive state, and
the controller is configured to control the initialization control device to switch the supply power connecting device into the first active state when the predetermined voltage is not supplied from the connection portion of the rechargeable battery after the second period of time from the time when the supply power connecting device is switched into the first inactive state.

7. The mobile phone apparatus according to claim 6, further comprising a charger detection device configured to detect whether the charger supplies power,
wherein, when the charger detection device detects that the charger does not supply power, the controller is configured to control the overvoltage protection device to switch the overvoltage protection device into the second active state.

8. The mobile phone apparatus according to claim 6, wherein the overvoltage protection device comprises a field effect transistor switch.

* * * * *